(12) United States Patent
Iijima et al.

(10) Patent No.: US 6,300,008 B1
(45) Date of Patent: Oct. 9, 2001

(54) METHOD FOR PRODUCING ELECTRODE FOR NON-AQUEOUS ELECTROLYTE BATTERY

(75) Inventors: Tadayoshi Iijima; Shigeo Kurose, both of Saku; Tetsuya Takahashi, Nagano, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/423,640

(22) PCT Filed: May 27, 1998

(86) PCT No.: PCT/JP98/02318

§ 371 Date: Nov. 18, 1999

§ 102(e) Date: Nov. 18, 1999

(87) PCT Pub. No.: WO98/54773

PCT Pub. Date: Dec. 3, 1998

(30) Foreign Application Priority Data

May 27, 1997 (JP) .................................... 9-136660

(51) Int. Cl.$^7$ ................................................ H01M 4/62
(52) U.S. Cl. ................ 429/217; 429/223; 429/231.95; 428/323
(58) Field of Search .................... 428/323, 697, 428/421; 429/231.1, 232, 217, 231.95, 223, 231.3, 221, 224

(56) References Cited

U.S. PATENT DOCUMENTS 5,672,445   9/1997   Nakamitsu et al. ................. 429/218

FOREIGN PATENT DOCUMENTS

| | | |
|---|---|---|
| 0 328 131 A2 | 8/1989 | (EP) . |
| 0 630 064 A1 | 12/1994 | (EP) . |
| 0794586A1 | 9/1997 | (EP) . |
| 0824087A1 | 2/1998 | (EP) . |
| 0827223A1 | 3/1998 | (EP) . |
| 09092282 | 4/1997 | (JP) . |

OTHER PUBLICATIONS

Abstract of Japanese Patent Publ. No. 0971816; dated Jun. 30, 1997.
Abstract of Japanese Patent Publ. No. 10092429; dated Apr. 10, 1998.
Abstract of Japanese Patent Publ. No. 07114915; dated May 2, 1995.
Abstract of Japanese Patent Publ. No. 62015761; dated Jan. 24, 1987.
Abstract of Japanese Patent Publ. No. 01105459; dated Apr. 21, 1989.
Abstract of Japanese Patent Publ. No. 04215252; dated Aug. 6, 1992.

Primary Examiner—Paul Thibodeau
Assistant Examiner—Monique R Jackson
(74) Attorney, Agent, or Firm—Arent Fox Kintner Plotkin & Kahn, PLLC

(57) ABSTRACT

A method for producing an electrode for a non-aqueous electrolyte battery with improved charge/discharge characteristics such as discharge capacity and charge/discharge cycle life and with improved physical properties of the coating film. A mixture-coating material is prepared by kneading an active material composed of $Li_xNi_yM_zO_2$ ($0.8<x<1.5$, $0.8<y+z<1.2$, $0\leq z<0.35$; M is at least one element selected from Co, Mg, Ca, Sr, Al, Mn and Fe), an electrically conductive agent composed of a graphite having a flaky shape, and a binder and/or a solvent in a kneading apparatus under a condition satisfying the formula:

$$Wa \cdot Sa \geq 0.5 \times Wg \cdot Sg$$

where a specific surface area of the active material by BET is represented by Sa, a blending weight thereof at the kneading step is represented by Wa, a specific surface area of the graphite by BET is represented by Sg, and a blending weight thereof at the kneading step is represented by Wg. The obtained mixture-coating material is applied onto a collector.

4 Claims, 1 Drawing Sheet

METHOD FOR PRODUCING ELECTRODE FOR NON-AQUEOUS ELECTROLYTE BATTERY

TECHNICAL FIELD OF THE INVENTION

The present invention relates to a method for producing an electrode for a non-aqueous electrolyte battery, and more particularly to a method for producing a non-aqueous electrolyte battery electrode which includes an electrode active material layer containing an active material composed of a lithium composite oxide and an electrically conductive agent composed of a graphite having a flaky shape, and which has excellent charge/discharge characteristics and excellent physical properties of the active material layer.

TECHNICAL BACKGROUND OF THE INVENTION

Recent development in the electronic field is remarkable, and reduction in size and weight of devices such as video cameras, liquid crystal cameras, portable telephones, laptop computers, and word processors is now taking place. There are increasing needs for development of batteries with reduced size and weight and having a high energy density as power sources for these electronic devices.

Conventionally, lead batteries or nickel-cadmium batteries have been used for these electronic devices. These conventional batteries cannot sufficiently meet the needs for reduction in size and weight and achievement of a high energy density.

As batteries that meet these demands, development of non-aqueous electrolyte secondary batteries employing metal lithium or a substance capable of being doped and undoped with lithium as a negative electrode has been carried out, whereby those using a lithium cobalt oxide ($LiCoO_2$) as a positive electrode material are already in practical use. This battery has a property of having a high voltage and a high energy density as compared with the conventional small secondary batteries. Therefore, they are greatly expected as a power source for driving a cordless devices, so that secondary batteries which are smaller and lighter than the conventional batteries can be fabricated.

Also, in order to achieve further reduction in size and weight and to obtain a further high energy density, development and research of active materials etc. is eagerly conducted, and a lithium nickel composite oxide $LiNiO_2$ is proposed as a positive electrode active material.

Here, in the electrode of a non-aqueous electrolyte battery, an electrically conductive agent is used because the active material has a poor electric conductivity except for some active materials.

For example, Japanese Laid-open Patent Publication No. 62-15,761/1987 discloses a non-aqueous electrolyte secondary battery using acetylene black as the electrically conductive agent. If acetylene black is used as the electrically conductive agent, there arises a problem that it is liable to be peeled off because of poor adhesion of the electrode-coating film to a collector due to large surface area of acetylene black or that the electrode is liable to be split because the electrode-coating film hardens, decreasing the flexibility of the electrode. Acetylene black is liable to be in an agglomerated state, so that the ratio of the area of the surface of acetylene black which surface is in contact with the active material, relative to the total surface area of acetylene black is not so large in view of its large specific surface area. If the amount of acetylene black is reduced in order to improve the physical properties of the electrode, the effects as the electrically conductive agent will decrease.

On the other hand, in the case where graphite is used as the electrically conductive agent, the effects as the electrically conductive agent will not appear so easily unless the graphite is used in a large amount, although the flexibility of the electrode-coating film is good. For example, Japanese Laid-open Patent Publication No. 1-105,459/1989 discloses a non-aqueous electrolytic solution secondary battery including a positive electrode containing $LiMn_2O_4$ and graphite as major components, a negative electrode, and a non-aqueous electrolytic solution, wherein a graphite content in the total amount of the above $LiMn_2O_4$ and the graphite is 8 to 22 wt %. This means that, in using graphite as the electrically conductive agent, effects are not produced unless the graphite is added in a large amount.

Japanese Laid-open Patent Publication No. 4-215,252/1992 discloses use of a flake graphite as an electrically conductive agent for a positive electrode in a non-aqueous electrolyte secondary battery. In this way, although there are disclosures on electrically conductive agents made of graphite, the prior art fails to disclose a kneading operation under a specific condition.

Generally, the larger the amount of the electrically conductive agent is, the easier it is to draw out the efficiency of the active material. However, if a large amount of the electrically conductive agent is incorporated in the electrode, the amount of the active material per unit volume will decrease, so that as a result the capacity as a battery will decrease. Therefore, attempts are made to reduce the amount of the electrically conductive agent while drawing out the efficiency of the active material.

However, according to the conventional methods of preparing an electrode mixture-coating material, a large amount of the electrically conductive agent must be added in the electrode mixture in order to obtain a sufficient electrode conducting property. As a result, there arises a problem that the charge/discharge capacities per unit electrode volume or per unit electrode weight decreases.

Also, non-aqueous electrolyte secondary batteries get deteriorated in that their capacity decreases in accordance with their repeated use. One of the factors that cause such a deterioration of the batteries is considered to be that the contact of the active material and the electrically conductive agent in the electrode gets poorer, making it difficult to draw out an electricity to the outside.

In view of these facts, it is desirable to maintain a good contact of the active material and the electrically conductive agent in the electrode while reducing the amount of the electrically conductive agent of graphite as much as possible.

DISCLOSURE OF THE INVENTION

Objects of the Invention

Accordingly, the purpose of the present invention is to solve the above-mentioned problems of the prior art and to provide a method for producing an electrode for a non-aqueous electrolyte battery with improved charge/discharge characteristics such as a discharge capacity and a charge/discharge cycle life and with improved physical properties of a coating film.

SUMMARY OF THE INVENTION

The present inventors have made an eager research and found out that, in the case where a lithium composite oxide as an active material and a graphite having a flaky shape as an electrically conductive agent are used, an electrode having good charge/discharge characteristics and stable physical properties of the coating film can be obtained, even with a small amount of the electrically conductive agent, by kneading the active material and the electrically conductive agent under a specific condition, thus completing the present invention.

Namely, the present invention provides a method for producing an electrode for a non-aqueous electrolyte battery by preparing an electrode active material mixture-coating material containing at least an active material composed of a lithium composite oxide, an electrically conductive agent composed of a graphite having a flaky shape, and a binder, and by applying the active material mixture-coating material onto a collector, said method comprising the step of preparing the mixture coating material by kneading at least said active material, said graphite, and a binder and/or a solvent in a kneading apparatus under a condition satisfying the formula:

$$\frac{Wa}{Wg} \geq \frac{0.5 \times Sg}{Sa}$$

where a specific surface area of said active material as measured by the BET method is represented by Sa, a blending weight of said active material at the kneading step is represented by Wa, a specific surface area of said graphite as measured by the BET method is represented by Sg, and a blending weight of said graphite at the kneading step is represented by Wg.

In the present invention, the lithium composite oxide is preferably $Li_xNi_yM_zO_2$ (where x satisfies 0.8<x<1.5, y+z satisfies 0.8<y+z<1.2, z satisfies 0≦z<0.35, and M is at least one element selected from Co, Mg, Ca, Sr, Al, Mn and Fe).

Also, in the present invention, the specific surface area Sa of the lithium composite oxide as measured by the BET method is preferably 0.1 to 5 $m^2/g$.

Further, in the present invention, the specific surface area Sg of the graphite as measured by the BET method is preferably 3 to 30 $m^2/g$.

According to the present invention, a sufficient electrode conducting property can be obtained by using only a small amount of the electrically conductive agent, since the lithium composite oxide as the active material and the graphite having a flaky shape as the electrically conductive agent are kneaded under a specific condition in preparing the active material mixture-coating material. As a result, the amount of the active material per unit electrode volume can be increased, giving large charge/discharge capacities per unit electrode volume. Also, the physical properties of the coating film are stabilized.

DETAILED DESCRIPTION OF THE INVENTION

In the present invention, a lithium composite oxide is used as an active material. Examples of the lithium composite oxides to be used include $Li_xCoO_2$ (0<x≦1.0), $Li_xNiO_2$ (0<x≦1.0), $Li_{1+x}Mn_{2-x}O_4$ (0≦x≦⅓), Li(M, Mn)$_2O_4$ (M=Cr, Co, Al, B), and others. In the present invention, it is particularly suitable in obtaining large capacity with low costs that the lithium composite oxide is $Li_xNi_yM_zO_2$ (where x satisfies 0.8<x<1.5, y+z satisfies 0.8<y+z<1.2, z satisfies 0≦z<0.35, and M is at least one element selected from Co, Mg, Ca, Sr, Al, Mn and Fe). In this case, the metal M is more preferably Co, and may be two or more kinds of the metals.

Also, in the present invention, the specific surface area Sa of the above-mentioned lithium composite oxide as measured by the BET method is preferably 0.1 to 5 $m^2/g$, more preferably 0.3 to 2 $m^2/g$.

An example of a method for producing such a lithium composite oxide is, for example, a process in which a basic metal salt and an alkaline water-soluble lithium compound containing respectively an anion that volatilizes at the time of calcination of $LiMetal^{3+}O_2$ (where the Metal contains Ni as a major component and further contains at least one element selected from Co, Mg, Ca, Sr, Al, Mn and Fe) are allowed to react in an aqueous medium to obtain a slurry, which is then dried and calcined.

The basic metal salt is represented by the general formula: $Metal^{2+}(OH)_{2-nk}(A^{n-})_k \cdot mH_2O$. Here, the $Metal^{2+}$ is an ion containing Ni as a major component and possibly containing at least one element selected from Co, Mg, Ca, Sr, Al, Mn and Fe. $A^{n-}$ represents an anion with n valences (where n=1 to 3) such as a nitrate ion, a chloride ion, a bromide ion, an acetate ion, or a carbonate ion. Further, k satisfies 0.03≦k≦0.3; and m satisfies 0≦m<2.

The basic metal salt represented by the above-mentioned formula can be produced by adding to an aqueous solution of $Metal^{2+}$ an alkali of about 0.7 to 0.95 equivalent, preferably about 0.8 to 0.95 equivalent, relative to the $Metal^{2+}$, and reacting them under a reaction condition of about 80° C. or less, and then maturing the reaction product at a temperature of 40° C. to 70° C. for 0.1 to 10 hours, followed by washing with water to remove the by-products. The alkali to be used in the reaction may be a hydroxide of an alkali metal such as sodium hydroxide, a hydroxide of an alkali earth metal such as calcium hydroxide, an amine, or the like.

A basic metal salt selected from the compounds represented by the above-mentioned formula and one or more lithium compounds selected from lithium hydroxide, lithium carbonate, hydrates thereof, and the like are allowed to react in water at a concentration in the range of 5 to 25 wt % and at a temperature in the range from room temperature to 100° C. to obtain a slurry, which is then subjected to spray drying for improvement of uniformity in the shape of the composition to be obtained.

The lithium composite oxide can be obtained by subjecting the dried product to a thermal treatment for calcination in an oxidizing gas atmosphere containing air, oxygen, ozone, or the like in a temperature range of about 700 to 1000° C. for about 0.1 to 20 hours.

Another example of a method for producing a lithium composite oxide to be used in the present invention is a process that uses a water-soluble lithium compound and a basic metal carbonate obtained from a water-soluble metal compound.

The water-soluble metal compound to be used in this process is a nitrate, a sulfate, a metal chloride, or the like. This water-soluble metal compound may contain a nickel compound as a major component and may be mixed with a given amount of another water-soluble metal compound so that at least one element selected from Co, Mg, Ca, Sr, Al, Mn and Fe may be blended therewith.

The basic metal carbonate may be obtained by filtrating and drying a precipitate obtained by allowing a mixture of the above-mentioned water-soluble metal compounds to react with a compound selected from the group consisting of an alkali carbonate, an alkali bicarbonate, ammonium carbonate and ammonium bicarbonate in water, or a precipitate obtained by allowing sodium hydroxide to be present for reaction in the above-mentioned reaction system. In this case, in order to produce a good precipitate, it is preferable to use a little excessive amount of the carbonate, and also it is important to control the stirring condition so as to control the specific surface area of the precipitate.

To the basic metal carbonate thus obtained, a powder of a water-soluble lithium compound such as lithium carbonate or lithium hydroxide is added at a desired ratio of the metal to Li. The resultant mixture in a powder state is first heated to 300 to 500° C. in the presence of an inert gas or an oxygen-containing gas. This heating allows only the decomposition of the basic metal carbonate to proceed, whereby carbonic acid gas in the crystal structure is released. This heating is continued until the generation of the carbonic acid gas substantially stops so as to convert all of the basic metal carbonate into a metal oxide having numerous fine pores.

After the generation of carbonic acid gas substantially stops, the temperature is further raised to allow the molten water-soluble lithium compound to penetrate into the fine pores of the metal oxide, whereby the two compounds will be in an extremely close contact. At this moment, the resultant product is calcined at a temperature of 700 to 900° C. in the presence of oxygen gas or an air rich in oxygen, whereby Ni is turned from bivalent to trivalent to produce a Li composite oxide.

Here, the larger the specific surface area of the basic metal carbonate to be used is (for example, more than 100 $m^2/g$), the more preferable it is, because gas discharge and generation of fine pores after preliminary calcination will be more efficiently performed.

Next, the electrically conductive agent will be explained. Since graphite has a cleavage property, the graphite can be cleft by utilizing this property to increase its specific surface area with little decrease in the particle diameter. However, graphite is liable to form a stack and, if a shear stress or the like is unskillfully applied to loosen the stack, it is likely to be stacked to a greater extent. For example, if an attempt is made to crush graphite with a ball mill or the like, there arises a problem that the graphite is liable to be stacked, although it can be crushed.

The stacked one is measured as a surface in a measurement gas. However, the surface is not utilized effectively in terms of a contact with the active material. If a pressure is applied to the stacked one, the surfaces will adhere to each other, so that they will not be measured in the measurement gas.

A graphite having a flaky shape has a small hardness and lubricity, whereas the active material has a comparatively large hardness. Therefore, by kneading the active material and said graphite, the graphite having a flaky shape is crushed in such a manner as to be peeled off along a crystal surface, while the active material is not broken so much.

Accordingly, in the present invention, a graphite having a flaky shape is used as the electrically conductive agent. Such a graphite is either a natural graphite or an artificial graphite and has a flaky shape. The term "flaky" as used in the present invention refers to a shape in which thin layers having a flaky shape, a vein shape, a thin slice shape, a layer shape, a mica-like shape, or the like shape are laminated. Specifically, although the natural graphite may have a varying shape depending on the place of production, it may be subjected to a post-processing, such as crushing or classification, to have a "flaky" shape as referred to in the present invention. Also, although the artificial graphite preferably has the above-mentioned flaky shape from immediately after its synthesis, it may be subjected to a post-processing, such as crushing or classification, to have a "flaky" shape in the same manner as the natural graphite. Among these graphites, a classified graphite is the most preferable because of the reason that the flaky structure is unified and other reasons.

Examples of such graphites having a flaky shape include the LF series manufactured by Chuetsu Graphite Works Co., Ltd., the UFG series manufactured by Showa Denko K.K., the KS series manufactured by LONZA Co., Ltd., MICROCARBO-G series manufactured by Kansai Netsukagaku Co., Ltd., the Ecoscarbons manufactured by Ecos Giken Co., Ltd., flake graphites and vein graphites produced in nature, and others.

In the present invention, the specific surface area Sg of the above-mentioned graphite as measured by the BET method is preferably 3 to 30 $m^2/g$, more preferably 5 to 15 $m^2/g$.

Also, the blending amount of the graphite as the electrically conductive agent is preferably 0.1 to 15 wt %, more preferably 1 to 10 wt %, in a dried coating film, although it varies depending on the specific surface area of the active material and the like.

The binder to be used in the present invention is one or a mixture of two or more of thermoplastic resins or polymers having a rubber elasticity. Examples of the binders to be used include fluorine-type polymers, polyvinyl alcohol, carboxymethyl cellulose, hydroxypropyl cellulose, regenerated cellulose, diacetyl cellulose, polyvinyl chloride, polyvinyl pyrrolidone, polyethylene, polypropylene, EPDM, sulfonated EPDM, SBR, polybutadiene, polyethylene oxide, and other known binders.

Among these, the fluorine-containing polymer preferably has an atomic ratio of fluorine atoms/carbon atoms in the range of 0.75 to 1.5, more preferably in the range of 0.75 to 1.3. If this value is larger than 1.5, it tends to be difficult to obtain a sufficient capacity of the battery. On the other hand, if it is smaller than 0.75, the binder is likely to be dissolved in the electrolytic solution.

Examples of such fluorine-containing polymers include polytetrafluoro-ethylene, polyvinylidene fluoride, vinylidene fluoride-ethylene trifluoride copolymers, ethylene-tetrafluoroethylene copolymers, propylene-tetrafluoroethylene copolymers, and the like. A fluorine-containing polymer with its hydrogen in the main chain substituted by an alkyl group(s) may be used as well.

Among these, those showing a selective solubility (having a low solubility in the electrolytic solution and being soluble in some solvents). For example, vinylidene fluoride-type polymers are only slightly soluble in a carbonate-type solvent that is used as the electrolytic solution or the like, but are soluble in a solvent such as N,N-dimethylformamide or N-methylpyrrolidone.

The amount of the binder to be blended is preferably 2 to 20 wt %, more preferably 3 to 15 wt % in a dried coating film, although it depends on the specific surface areas and the particle size distributions of the active material and the electrically conductive agent, the strength of the intended electrode, and the like.

The solvent to be used for the preparation of the active material mixture-coating material is not specifically limited and may be a general solvent capable of dissolving or diluting the above-mentioned binder or capable of forming a dispersion body such as an emulsion. Examples of the solvents include saturated hydrocarbons such as hexane, aromatic hydrocarbons such as toluene and xylene, alcohols such as methanol, ethanol, propanol, and butanol, ketones such as acetone, methyl ethyl ketone, methyl isobutyl ketone, diisobutyl ketone, and cyclohexanone, esters such as ethyl acetate and butyl acetate, ethers such as tetrahydrofuran, dioxane, and diethyl ether, amides such as N,N-dimethylformamide, N-methylpyrrolidone, and N,N-dimethylacetamide, halogenated hydrocarbons such as ethylene chloride and chlorobenzene, water, various aqueous solutions, and the like known solvents. Among these, amide-type solvents are preferable because they can dissolve the fluorine-containing polymers. These solvents may be used either alone or as a mixture of two or more thereof.

In the present invention, the active material composed of the lithium composite oxide, the electrically conductive agent composed of the graphite having a flaky shape, and the binder and/or the solvent, as mentioned above, are kneaded in a kneading apparatus under a condition satisfying the formula:

$$\frac{Wa}{Wg} \geq \frac{0.5 \times Sg}{Sa}$$

where the specific surface area of said active material as measured by the BET method is represented by Sa, the blending weight of said active material at the kneading step is represented by Wa, the specific surface area of said graphite as measured by the BET method is represented by Sg, and the blending weight of said graphite at the kneading step is represented by Wg.

The electrically conducting effects can be produced with only a small amount of graphite by performing a kneading operation using the active material at a large weight ratio relative to the total amount of the graphite in order to meet such a condition.

In other words, a graphite having a flaky shape has a small hardness and lubricity, whereas the active material has a comparatively large hardness. Therefore, by kneading the active material of a large weight ratio and said graphite, the graphite having a flaky shape is crushed in such a manner as to be peeled off along a crystal surface, while the active material is not broken so much. Therefore, the stack of the graphite can be removed. As a result, the effective area of the graphite which is brought into contact with the active material will be large, thereby increasing the electrically conductive effects.

As a concrete kneading operation, the active material may be blended by setting its weight ratio to be as large as possible relative to the total amount of the electrically conductive agent made of a graphite having a flaky shape so as to satisfy the above-mentioned numerical formula, and after the binder solution, the binder and/or the solvent is added, the mixture may be kneaded by means of a kneading apparatus.

In this operation, the total amount of the active material may be kneaded with the graphite, or alternatively, a portion of the active material may be kneaded with the graphite to satisfy the above-mentioned numerical formula and then the active material separately kneaded with the binder solution or the solvent may be mixed.

A shear force can be obtained by adding a liquid to the active material and the graphite and then kneading the mixture. Although this liquid may be a solvent, it is preferably a binder solution obtained by dissolving a high-viscosity binder in a solvent if a stronger shear force is needed. Also, if the binder is a liquid, it may be used as it is. However, if the shear force is too strong, it is better to use a binder solution with reduced viscosity obtained by adding a solvent to the binder. Preferably, the binder and the solvent are used in combination because they can be selected by confirming the various physical properties.

After the kneading operation, desired materials are preferably added so as to achieve the intended final blending ratio in the mixture-coating material. Also, in accordance with the needs, final adjustment of the electrode active material mixture coating material may be carried out to meet the condition of the coater by dispersion using a stirring mixer such as a hyper mixer, a dissolver, or a sand grinder mill.

At the time of kneading, it is necessary to fully knead the mixture by blending an amount of materials to meet a kneading volume of the kneading apparatus to be used. Also, unless the kneading operation is carried out so as not to leave any void in the kneading apparatus, the crushing of the graphite will be insufficient, rendering it difficult to achieve the object of the present invention.

In the present invention, the kneading apparatus may be a kneader, a planetary mixer, a two-roll mill, a three-roll mill, a Banbury mixer, or the like. The kneader is an apparatus that gives a shear between a rotating blade and a kneading tank. The kneader may be of a single-process type or a continuous-process type. Either of these two types may be used.

Examples of single-process type kneaders include an open-type kneader, pressure-type kneader, and the like. Since the open-type kneader is open at its top, voids are generated, so that it is rather unsuitable for achieving the object of the present invention. The pressure-type kneader can produce the effects of the present invention in the most efficient manner because the voids can be controlled to the minimum. Also, the kneader of continuous process type does not decrease the effects of the present invention because it has a feeding structure, although it slightly generates voids as compared with the pressure type. The kneader of continuous process type is preferable because it can carry out the steps continuously including the preprocesses such as preliminary mixing and the postprocesses such as kneading, dilution, and dissolution.

Examples of the rotating blade to be used in such a kneader include a Σ-type blade, a Z-type blade, a cam-type blade, a roller-type blade, an S-type blade, a fishtail-type blade, and a Banbury-type blade.

Examples of the kneader include single-type kneaders such as an MS-type pressure-type kneader manufactured by Moriyama Co., Ltd., continuous kneaders such as KRC kneaders manufactured by Kurimoto, Ltd., and extruders manufactured by Fuji Powdernel, Kobe Seitetsusho, Toshiba Machine Co., Ltd., and further, small-type kneaders such as a desktop-type kneader manufactured by Irie Shokai Co., Ltd., a kneader manufactured by Takabayashi Rika Co., Ltd., a Laboplastomill and a Blavender manufactured by Toyo Seiki Co., Ltd.

The prepared mixture-coating material is applied onto a collector and dried. The collector is not specifically limited and may be any electron-conducting substance that does not undergo a chemical change when it is formed into a battery. For example, the collector may be formed of aluminum, an aluminum alloy, nickel, stainless steel, titanium, or the like. Besides these metals, aluminum or stainless steel whose surface is treated with carbon, nickel, or titanium may be used as well. Especially, aluminum or an aluminum alloy is preferable. The collector may have a foil-like, film-like, net-like, porous, foamed, or the like shape. The thickness of the collector is 1 to 100 μm, preferably 1 to 50 μm.

The electrode active material mixture-coating material is applied onto the collector by an ordinary well-known coating method such as the reverse roll method, direct roll method, blade method, knife method, extrusion nozzle method, curtain method, gravure roll method, bar coat method, dip method, kiss coat method, squeeze method, and the like. Among these, it is preferable to adopt the extrusion nozzle method, whereby a good surface state of the coating layer can be obtained by suitably selecting the solvent composition of the mixture and the drying condition so that the coating material is applied onto the collector at a rate of 5 to 100 m/min.

The drying temperature is preferably 30 to 150° C. more preferably 50 to 140° C. If the drying temperature is less than 30° C., the solvent will not be sufficiently dried. On the other hand, if the drying temperature exceeds 150° C., the binder may not be distributed uniformly on the surface of the electrode because the evaporation speed of the solvent is too high, thereby leading to deterioration in the electrode properties.

Here, the thickness, length, and width of the coating layer is determined by the final size of the battery to be obtained. The thickness of the coating layer is preferably adjusted by the ordinarily-adopted press processing after the coating step. The processing pressure is preferably 0.2 to 10 t/cm, and the processing temperature is preferably 10 to 150° C.

MODE FOR CARRYING OUT THE INVENTION

Figure 1:
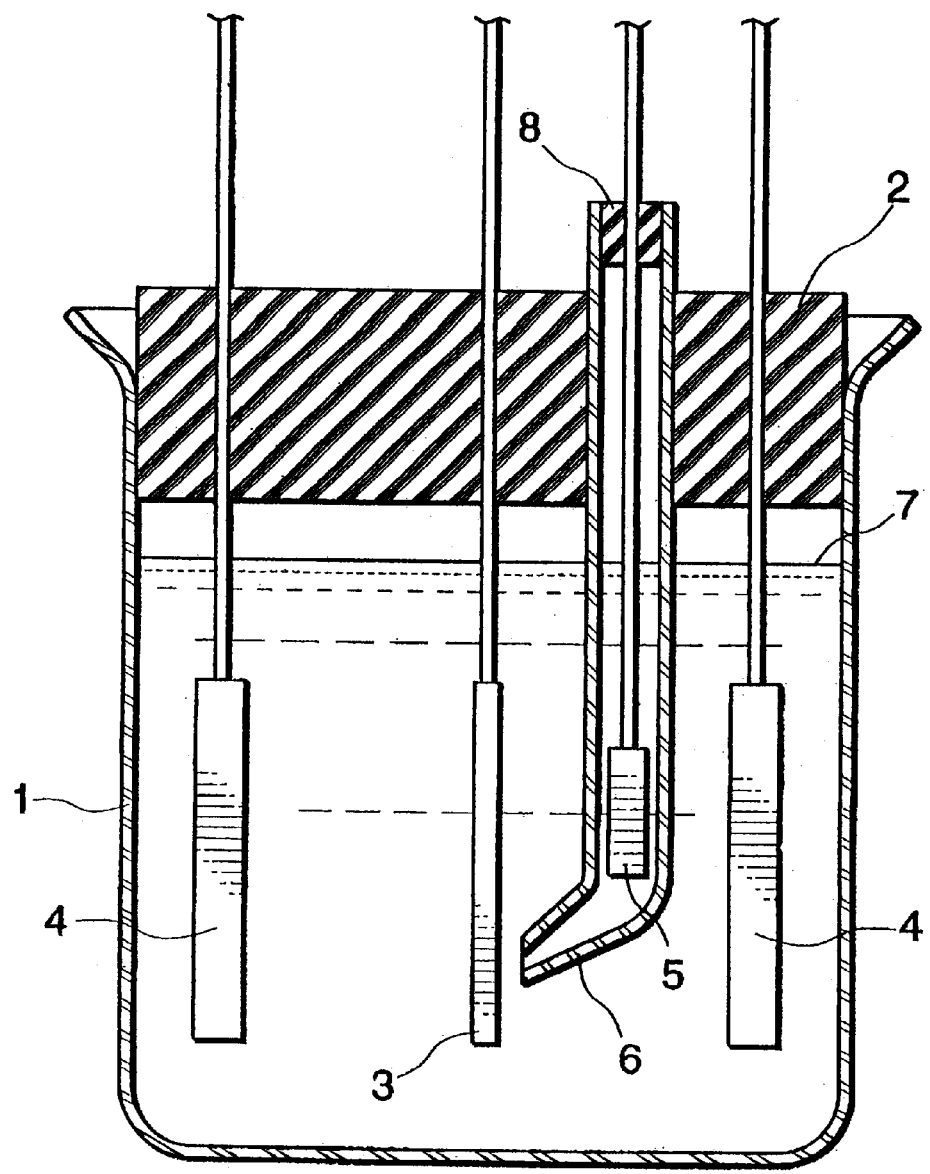
FIG. 1 is a schematic view illustrating a cell used in examples of the present invention for measurement of charge/discharge capacities.

Hereafter, the present invention will be more specifically explained with reference to examples shown below. However, the present invention is not limited by these examples.

EXAMPLE 1

An active material mixture-coating material was prepared in the following manner.
(Blending Composition of Coating Material)
    Active material: $LiNi_{0.8}Co_{0.2}O_2$ 92 parts by weight
      BET specific surface area : $0.5\ m^2/g$
    Electrically conductive agent: 4 parts by weight
      Graphite KS25 manufactured by LONZA
      BET specific surface area: $11.8\ m^2/g$
    Binder: ELF-ATOCHEM Japan KYNAR 741 4 parts by weight
      polyvinylidene fluoride (PVDF)
    Solvent: N-methyl-2-pyrrolidone (NMP) 67 parts by weight The binder (4 parts by weight) was dissolved in the solvent (36 parts by weight) to prepare a binder solution (40 parts by weight). The active material (92 parts by weight) and the electrically conductive agent (4 parts by weight) were mixed in dry process by means of a hypermixer; and the mixture was introduced into a pressure kneader. The above-mentioned binder solution (13 parts by weight) was added to the mixture and the resultant was kneaded for 30 minutes while cooling the jacket of the pressure kneader with water. The kneaded product was taken out, and the binder solution (27 parts by weight) and the solvent (31 parts by weight) were added to dissolve the product in the hypermixer to give an active material-mixture coating material.

The prepared mixture-coating material was applied onto one surface of a collector of aluminum foil of 20 μm thickness by means of a blade coater and dried at 120° C. Then, the mixture-coating material was applied to the other surface of the collector in a similar manner and dried. The obtained coated collector was calendered by means of a roller press machine and cut into a given size to obtain an electrode of Example 1 with a mixture layer of 65 μm thickness on one side.

EXAMPLE 2

The active material, the electrically conductive agent, the binder and the solvent, which were the same as those of Example 1, were used.

The binder (5.3 parts by weight) was dissolved in the solvent (47.7 parts by weight) to prepare a binder solution (53 parts by weight).

The active material (88 parts by weight) and the electrically conductive agent (7 parts by weight) were mixed in dry process by means of a hypermixer; and the mixture was introduced into a pressure kneader. The above-mentioned binder solution (13 parts by weight) was added to the mixture and the resultant was kneaded for 30 minutes while cooling the jacket of the pressure kneader with water (ratio by weight at kneading Wa:Wg=50:4). The kneaded product was taken out as a kneaded product (A).

The active material (97 parts by weight) was introduced into a pressure kneader, and the above-mentioned binder solution (13 parts by weight) was added thereto. The resultant mixture was kneaded for 30 minutes while cooling the jacket of the pressure kneader with water. The kneaded product was taken out as a kneaded product (B).

The kneaded product (A) (61.7 parts by weight), the kneaded product (B) (47.3 parts by weight), the binder solution (27 parts by weight), and the solvent (31 parts by weight) were added and dissolved by means of a hyper mixer to prepare an active material mixture-coating material. The final blending composition of this mixture-coating material is the same as that of the mixture-coating material of Example 1.

The prepared mixture-coating material was applied onto a collector in the same manner as in Example 1 to fabricate an electrode of Example 2.

EXAMPLE 3

An active material mixture-coating material was prepared by an operation similar to that of Example 1 except that the electrically conductive agent of Example 1 was changed into KS 44 (BET specific surface area: $8.7\ m^2/g$) manufactured by LONZA.

The prepared mixture-coating material was applied onto a collector in the same manner as in Example 1 to fabricate an electrode of Example 3.

EXAMPLE 4

An active material mixture-coating material was prepared by an operation similar to that of Example 1 except that the electrically conductive agent of Example 1 was changed into flaky natural graphite (LF-18A manufactured by Chuetsu Graphite Works Co., Ltd., BET specific surface area: $5.2\ m^2/g$).

The prepared mixture-coating material was applied onto a collector in the same manner as in Example 1 to fabricate an electrode of Example 4.

Comparative Example 1

The active material, the electrically conductive agent, the binder and the solvent, which were the same as those of Example 1, were used.

The binder (5.3 parts by weight) was dissolved in the solvent (47.7 parts by weight) to prepare a binder solution (53 parts by weight).

The active material (78 parts by weight) and the electrically conductive agent (10.4 parts by weight) were mixed in dry process by means of a hypermixer; and the mixture was introduced into a pressure kneader. The above-mentioned binder solution (13 parts by weight) was added to the mixture and the resultant was kneaded for 30 minutes while cooling the jacket of the pressure kneader with water. The kneaded product was taken out as a kneaded product (C).

The active material (97 parts by weight) was introduced into a pressure kneader, and the above-mentioned binder solution (13 parts by weight) was added thereto. The resultant mixture was kneaded for 30 minutes while cooling the jacket of the pressure kneader with water. The kneaded product was taken out as a kneaded product (D).

The kneaded product (C) (39 parts by weight), the kneaded product (D) (70.3 parts by weight), the binder solution (26.7 parts by weight), and the solvent (31 parts by weight) were added and dissolved by means of a hyper mixer to prepare an active material mixture coating material. The final blending composition of this mixture-coating material is the same as that of the mixture-coating material of Example 1.

The prepared mixture-coating material was applied onto a collector in the same manner as in Example 1 to fabricate an electrode of Comparative Example 1.

Comparative Example 2

The active material, the electrically conductive agent, the binder and the solvent, which were the same as those of Example 1, were used.

The binder (5.6 parts by weight) was dissolved in the solvent (50.4 parts by weight) to prepare a binder solution (56 parts by weight).

The electrically conductive agent, (40 parts by weight) was introduced into a pressure kneader, and the above-mentioned binder solution (16 parts by weight) was added thereto. The resultant mixture was kneaded for 30 minutes while cooling the jacket of the pressure kneader with water. The kneaded product was taken out as a kneaded product (E).

The active material (97 parts by weight) was introduced into a pressure kneader, and the above-mentioned binder solution (13 parts by weight) was added thereto. The resultant mixture was kneaded for 30 minutes while cooling the jacket of the pressure kneader with water. The kneaded product was taken out as a kneaded product (F).

The kneaded product (E) (5.6 parts by weight), the kneaded product (F) (104.3 parts by weight), the binder solution (26.1 parts by weight), and the solvent (31 parts by weight) were added and dissolved by means of a hyper mixer to prepare an active material mixture-coating material. The final blending composition of this mixture-coating material is the same as that of the mixture-coating material of Example 1.

The prepared mixture-coating material was applied onto a collector in the same manner as in Example 1 to fabricate an electrode of Comparative Example 2.

Comparative Example 3

The active material, the electrically conductive agent, the binder and the solvent, which were the same as those of Example 1, were used.

The binder (4 parts by weight) was dissolved in the solvent (36 parts by weight) to prepare a binder solution (40 parts by weight).

The active material (92 parts by weight) and the electrically conductive agent (4 parts by weight) were mixed in dry process by means of a Henschel mixer, and the above-mentioned binder solution (13 parts by weight) was added to this mixture. The resultant was mixed for 30 minutes while cooling the jacket of the Henschel mixer with water. The binder solution (27 parts by weight) and the solvent (31 parts by weight) were added to this mixture and dissolved to prepare an active material mixture-coating material.

The prepared mixture-coating material was applied onto a collector in the same manner as in Example 1 to fabricate an electrode of Comparative Example 3.

Comparative Example 4

The active material, the electrically conductive agent, the binder and the solvent, which were the same as those of Example 1, were used.

The binder (4 parts by weight) was dissolved in the solvent (36 parts by weight) to prepare a binder solution (40 parts by weight).

The active material (92 parts by weight) and the electrically conductive agent (4 parts by weight) were mixed in dry process by means of a hyper mixer; and the above-mentioned binder solution (40 parts by weight) and the solvent (31 parts by weight) were added to this mixture. The resultant was mixed with stirring for 30 minutes to prepare an active material mixture-coating material.

The prepared mixture-coating material was applied onto a collector in the same manner as in Example 1 to fabricate an electrode of Comparative Example 4.

Comparative Example 5

The active material mixture-coating material obtained in Comparative Example 4 was further dispersed by means of a pin-type sand grinder mill (SGM) with a dispersion medium of zirconia beads so that the staying time of the coating material in the disperser was 15 minutes to prepare a mixture-coating material.

The prepared mixture-coating material was applied onto a collector in the same manner as in Example 1 to fabricate an electrode of Comparative Example 5.

Comparative Example 6

An active material mixture-coating material was prepared by an operation similar to that of Example 1 except that the electrically conductive agent of Example 1 was changed into acetylene black (Denka Black manufactured by Denki Kagaku Kogyo Co., Ltd., BET specific surface area: 60.2 $m^2/g$).

The prepared mixture-coating material was applied onto a collector in the same manner as in Example 1 to fabricate an electrode of Comparative Example 6.

Each of the electrodes obtained in Examples 1 to 4 and Comparative Examples 1 to 6 were evaluated in the following manner.

(Adhesion Property)

The adhesion of the active material-coating film to an aluminum foil was examined by a test according to the checker board method of JIS (Japanese Industrial Standard) K 5400 8.5.1. One surface of the coating film, which was applied onto both surfaces of the aluminum foil, was cut to form incisions in a checker board shape by means of a scratching tester (ERICHSEN MODEL 295 with 11 blades spaced apart from each other by 1 mm) to score the coating film according to JIS.

(Electrode Characteristics)

Each of the samples of Examples 1 to 4 and Comparative Examples 1 to 6 was cut into a rectangular shape of 25 mm×20 mm. Then, an upper portion of the electrode layer was removed by a width of 5 mm to leave an electrode layer of 20 mm square. A stainless steel wire was spot-welded as a lead wire onto the upper portion of the electrode where the electrode layer was removed, thus preparing this electrode (working electrode).

A cell for measuring the charge/discharge capacities was prepared as shown in FIG. 1, and the charge/discharge operations were carried out in the following manner.

Namely, with reference to FIG. 1, in a beaker (1) were disposed a pair of counter electrodes (4) made of a lithium plate and connected to a stainless steel wire, a Capillary tube (6) having a similar reference electrode (5), and the electrode (working electrode) (3) as prepared above. The working electrode (3) was disposed in the middle of the two counter electrodes (4). An electrolytic solution (7) was prepared by dissolving 1 mol/liter of lithium perchlorate as an electrolyte salt in a mixture solvent containing ethylene carbonate and diethyl carbonate at 1:1 (volume ratio). The beaker (1) and the Capillary tube (6) were sealed with silicon plugs (2) and (8), respectively, to prepare the cell for measurement.

The charge and discharge operations were carried out on this cell for five times with a constant current of 6 mA within the range from 3 V to 4.2 V (potential vs. Li/Li$^+$). The capacity at the first time of doping with Li ions was measured as the initial capacity. Also, the capacity at the fifth time was measured to determine the charge/discharge cycle characteristics. The above results are shown in Table 1.

Examples 1 and 2. Comparative Example 6 uses acetylene black as the electrically conductive agent and is inferior in the adhesion property.

The present invention can be carried out in any other embodiments without departure to the spirit and major characteristics of the present invention. Accordingly, the above examples are described merely for illustrative purposes and these should not be construed as restrictive. Further, any modification within the equivalent to the claims is intended to fall under the scope of the present invention.

INDUSTRIAL APPLICABILITY

As shown and described above, according to the present invention, a sufficient electrode conducting property can be obtained by using only a small amount of the electrically conductive agent, since a lithium composite oxide as the active material and a graphite having a flaky shape as the electrically conductive agent are kneaded under a specific condition in preparing the active material mixture-coating material. As a result, the amount of the active material per unit electrode volume can be increased, giving large charge/discharge capacities per unit electrode volume. Also, the physical properties of the coating film are stabilized.

The present invention contributes to improvement of charge/discharge characteristics such as the discharge capacity and the charge/discharge cycle life of non-aqueous electrolyte batteries and to improvement of the physical properties of the electrode coating film.

What is claimed is:

1. A method for producing an electrode for a non-aqueous electrolyte battery by preparing an electrode active material mixture-coating material containing at least an active material composed of a lithium composite oxide, an electrically conductive agent composed of a graphite having a flaky shape, and a binder, and by applying the active material mixture-coating material onto a collector, said method com-

TABLE 1

|  | Kneading Apparatus | Electrically Conductive Agent | Weight Ratio at Kneading Wa:Wg | Initial Capacity (mAh/g) | Fifth Capacity (mAh/g) | Checker Board Test |
| --- | --- | --- | --- | --- | --- | --- |
| Example 1 | Pressure Kneader | KS25 | 92:4 | 190 | 183 | 8 points |
| Example 2 | Pressure Kneader | KS25 | 50:4 | 184 | 176 | 8 points |
| Example 3 | Pressure Kneader | KS44 | 92:4 | 197 | 190 | 8 points |
| Example 4 | Pressure Kneader | LF-18A | 92:4 | 191 | 185 | 8 points |
| Comparative Example 1 | Pressure Kneader | KS25 | 30:4 | 170 | 156 | 8 points |
| Comparative Example 2 | Pressure Kneader | KS25 | 0:4 | 145 | 100 | 8 points |
| Comparative Example 3 | Henschel Mixer | KS25 | — | 155 | 135 | 8 points |
| Comparative Example 4 | Hyper Mixer | KS25 | — | 157 | 139 | 8 points |
| Comparative Example 5 | SGM | KS25 | — | 158 | 141 | 8 points |
| Comparative Example 6 | Pressure Kneader | Denka Black | 92:4 | 193 | 187 | 2 points |

From Table 1, it is understood that each of Examples 1 to 4 exhibits large charge/discharge capacities with improved cycle characteristics that are suggestive of the life of the secondary battery, since the active material and the graphite were kneaded under the specific condition of the present invention. Also, the adhesion of the active material-coating film onto the aluminum foil is good, and its score in the checker board test is high points.

In contrast, each of Comparative Examples 1 to 5 exhibits small charge/discharge capacities with inferior cycle characteristics, although the final blending composition of the mixture-coating material is the same as those of prising the step of preparing the mixture-coating material by kneading at least said active material, said graphite, and a binder and/or a solvent in a kneading apparatus under a condition satisfying the formula:

$$\frac{Wa}{Wg} \geq \frac{0.5 \times Sg}{Sa}$$

where a specific surface area of said active material as measured by the BET method is represented by Sa, a blending weight of said active material at the kneading step is represented by Wa, a specific surface area of said graphite as measured by the BET method is represented by Sg, and a blending weight of said graphite at the kneading step is represented by Wg.

2. A method for producing an electrode for a non-aqueous electrolyte battery according to claim 1, wherein the lithium composite oxide is $Li_xNi_yM_zO_2$, where x satisfies 0.8<x<1.5, y+z satisfies 0.8<y+z<1.2, z satisfies 0≦z<0.35, and M is at least one element selected from Co, Mg, Ca, Sr, Al, Mn and Fe.

3. A method for producing an electrode for a non-aqueous electrolyte battery according to claim 2, wherein the specific surface area Sa of the lithium composite oxide as measured by the BET method is 0.1 to 5 $m^2/g$.

4. A method for producing an electrode for a non-aqueous electrolyte battery according to claim 2 or 3, wherein the specific surface area Sg of the graphite as measured by the BET method is 3 to 30 $m^2/g$.

* * * * *